United States Patent
Shipley

(10) Patent No.: US 8,057,771 B2
(45) Date of Patent: *Nov. 15, 2011

(54) PROCESS FOR RECOVERING USEFUL PRODUCTS AND ENERGY FROM SILICEOUS PLANT MATTER

(76) Inventor: Larry W. Shipley, Fairbury, NE (US)

( * ) Notice: Subject to any disclaimer, the term of this patent is extended or adjusted under 35 U.S.C. 154(b) by 766 days.

This patent is subject to a terminal disclaimer.

(21) Appl. No.: 11/747,052

(22) Filed: May 10, 2007

(65) Prior Publication Data

US 2010/0092365 A1    Apr. 15, 2010

Related U.S. Application Data

(63) Continuation of application No. 11/094,669, filed on Mar. 30, 2005, now Pat. No. 7,270,794.

(51) Int. Cl.
*C01B 33/12* (2006.01)
(52) U.S. Cl. ........................................ 423/335
(58) Field of Classification Search .................. 423/335
See application file for complete search history.

(56) References Cited

U.S. PATENT DOCUMENTS

| | | | | | |
|---|---|---|---|---|---|
| 4,214,920 | A | * | 7/1980 | Amick et al. | 438/57 |
| 4,422,297 | A | * | 12/1983 | Rojey | 60/651 |
| 4,973,462 | A | * | 11/1990 | Akira et al. | 423/339 |
| 5,658,548 | A | * | 8/1997 | Padhye et al. | 423/335 |
| 5,833,940 | A | * | 11/1998 | Reiber et al. | 423/334 |
| 6,183,597 | B1 | * | 2/2001 | Siegle | 162/16 |
| 6,406,678 | B1 | * | 6/2002 | Shipley | 423/335 |

* cited by examiner

*Primary Examiner* — Jessica L Ward
*Assistant Examiner* — Paul Wartalowicz
(74) *Attorney, Agent, or Firm* — Lemoine & Associates L.L.C.

(57) ABSTRACT

In the process disclosed herein, siliceous plant matter is steeped in water, soaked in an aqueous solution containing a solute which solubilizes inorganic oxides, soaked in an aqueous solution containing an oxidizing solute, rinsed, dried and thermally pyrolyzed to produce amorphous silica with of low carbon content, low water content, low inorganic impurity content and is of high porosity. Practice of the invention yields usable energy, does not produce carbonization of the atmosphere and is of lower nitrogen oxide and sulphur emission than currently used processes. By varying steps of the process herein disclosed, the carbon content, inorganic impurities and porosity of the resulting amorphous silica may be selectively controlled.

9 Claims, 1 Drawing Sheet

PROCESS FOR RECOVERING USEFUL PRODUCTS AND ENERGY FROM SILICEOUS PLANT MATTER

This application is a continuing application arising from presently pending U.S. patent application Ser. No. 11/094,669.

BACKGROUND OF THE INVENTION

1. Field of the Invention

The invention disclosed and claimed relates to a method for recovery of useful products and energy from siliceous plant matter by an environmentally sound process. With more particularity the invention herein set forth relates to recovery of products such as amorphous silica, lignin, hemicellulose, cellulose derived sugars and heat energy from the renewable resource of siliceous plants, including rice hulls, stalks and leaves, by a process which avoids a net increase of carbonization of the atmosphere and has decreased nitrous oxide and sulphur emissions. In addition, by varying certain steps of the invention, a practitioner thereof is able to selectively control the "quality" (namely with greater or lesser carbon content, more or less inorganic residue and more or less porosity) of the amorphous silica produced by the disclosed invention. Furthermore, the invention herein may be used to produce amorphous silica of greater purity (substantially free of elemental carbon, organic and inorganic impurities) and porosity (larger surface area per unit of weight) not previously able to be extracted by pyrolysis from siliceous plant matter.

2. Description of Related Art

Amorphous silica is currently manufactured, marketed and utilized for numerous purposes. However, except for U.S. Pat. No. 6,406,678 to Shipley, the processes by which amorphous silica are presently made result in consumption of substantial energy from externally supplied sources, introduce substantial carbon, nitrogen oxide and sulphur emissions into the atmosphere and/or employ the use of strong, polluting chemicals (see background information set forth in U.S. Pat. No. 6,406,678 to Shipley and U.S. Pat. No. 6,375,735 to Stephens et al for discussion of various other art used for production of amorphous silica). Furthermore, as found in siliceous plant matter amorphous silica exists in a lattice-like structure, intimately interlaced with various organic compounds, such as cellulose, lignin, hemicellulose and various inorganic compounds including salts, gels, hydrates and oxides of iron, potassium, calcium and sodium. Removal of these organic and inorganic compounds by pyrolysis (thereby producing usable heat energy), so as to leave substantially pure amorphous silica having high porosity (as it exists in the plant matter) has been problematic. Removal of carbon and organic impurities is commonly incomplete if the plant matter is pyrolyzed at low temperature. Pyrolysis at greater temperatures causes fluxing of the lattice-like structure of the silica, reducing its porosity (the effective surface area per unit of weight) and entrapping impurities within said structure. Pyrolysis at even higher temperatures causes undesirable crystallization of the silica. Pyrolysis alone does little to remove inorganic impurities. Post-pyrolysis removal of inorganic impurities from the silica is problematic if the silica was fluxed during pyrolysis.

On the other hand, production of energy from siliceous plant matter, such as rice hulls (see, for example, U.S. Pat. No. 3,959,007 to Pitt), has certain disadvantages. Namely lignin, hemicellulose, cellulose derived sugars and other useful organic compounds that might have otherwise been recovered are destroyed in combustion. Combustion of these organic compounds results in increased nitrogen oxide and sulphur emissions. In addition thereto surfaces (such as water tubes of steam generating boilers) which come into contact with combustion products tend to become coated with glass, reducing the efficiency of such boilers to recover heat energy. Moreover, the resulting siliceous ash contains substantial quantities of carbon, organic and inorganic impurities, causing such ash to be of limited utility. While such silica may be dissolved into water-glass, then relatively pure amorphous silica precipitated therefrom, such process utilizes substantial quantities of energy, employs use of harsh and polluting chemicals and the resulting amorphous silica retains too much water to be suitable for use in various applications (such as silicone rubber products intended for delayed curing at room temperature).

The invention herein disclosed provides a means by which amorphous silica of selected characteristics (including the amount of carbon, inorganic impurities and porosity), may be extracted; lignin, hemicellulose, cellulose derived sugars and useable energy may also be extracted, from siliceous plant matter, such rice hulls, straw and leaves, by means which is environmentally friendly (does not carbonize the atmosphere, has decreased nitrogen oxide and sulphur emissions and does not involve the use of strong, polluting chemicals).

OBJECTS OF THE INVENTION

A chief object of the invention is to provide a process whereby renewable siliceous plant matter, which is now frequently considered a waste by-product of food production, may be used for beneficial purposes, namely both for the production of useful physical products, such as silica, particularly highly pure amorphous silica having large porosity, lignin, hemicellulose and cellulose derived sugars, and for the production of usable energy. Another chief object of the invention is to provide a means for the production of said physical products and useful energy in a manner which is environmentally friendly, namely does not carbonize the atmosphere, does not rely on use of harsh, polluting chemicals and has less nitrous oxide and sulphur emissions than currently used means. A further object of the invention is to provide a process by which the quality (namely the amount of carbon, inorganic compounds and porosity) of the amorphous silica resulting from the process may be selectively controlled as desired.

SUMMARY OF THE INVENTION

The process herein described is directed to beneficial use of siliceous plant matter, such as rice hulls, straw and leaves, to produce a variety of products, such as silica, lignin, and hemicellulose, cellulose derived sugars and usable energy, by means which does not carbonize the atmosphere, has decreased nitrous oxide and sulphur emissions and does not employ the use of harsh, polluting chemicals.

The siliceous plant matter may be, according to the nature and quality of the end-products desired, subjected to steeping in water, separation of steep-water and processing of the solids to cause reduction of hydrocarbons and/or removal of inorganic compounds prior to pyrolysis. Lignin, hemicellulose and cellulose derived sugars may be recovered from water used to steep and/or soak the siliceous plant matter. Pyrolysis of the solids in the presence of oxygen yields a siliceous ash. By varying the steps prior to pyrolysis and the temperature of pyrolysis, the resulting siliceous ash may selectively contain more or less amorphous or crystalline silica, more or less carbon, more or less inorganic residue and have desired porosity.

Treatment prior to pyrolysis may selectively include: steeping in water; removing the steep-water; reducing organic compounds of the solids by soaking in an aqueous solution containing an oxidizing solute;, solubilizing inorganic compounds of the solids by soaking in an aqueous solution containing chelating agents, mineral and/or organic acids; and, rinsing and drying said solids. The remaining solids are then exothermically pyrolyzed in the presence of oxygen, typically at a temperature below that which causes crystalline silica to form. Heat from pyrolysis may be captured for beneficial use thereof, including the generation of electrical energy. Following pyrolysis, the resulting siliceous ash, (comprising amorphous silica) may be washed with water and/or subject to a variety of chemical rinses for removal of even more impurities. Lignin, hemicellulose and cellulose derived sugars may be recovered from the steep water. By removing lignin, hemicellulose cellulose derived sugars prior to pyrolysis, nitrogen oxide and sulphur emissions resulting from pyrolysis are reduced. By varying the steps of the processes herein disclosed, silica of different grades can selectively be produced.

PREFERRED EMBODIMENT OF THE INVENTION

Figure 1:
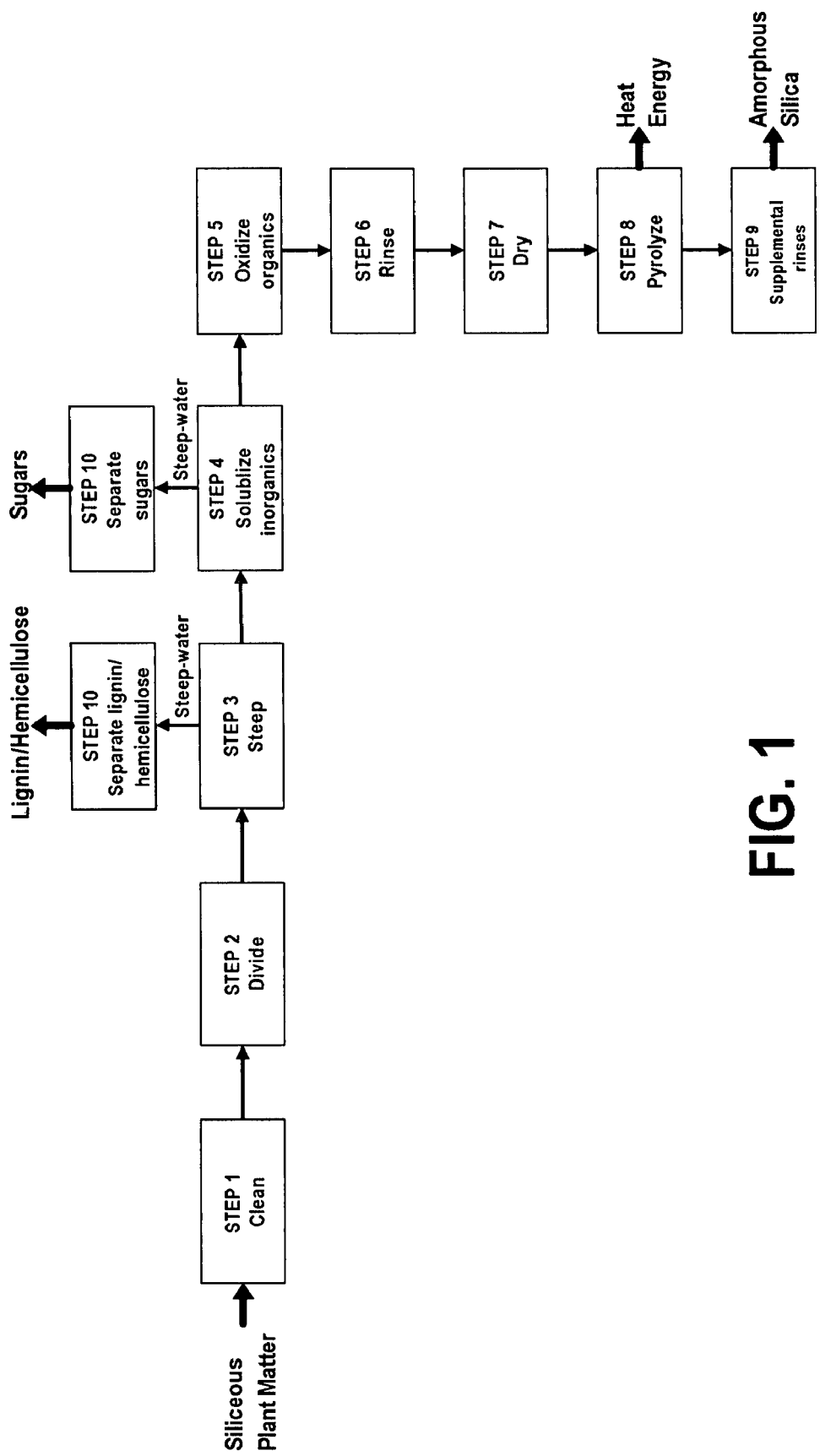
FIG. 1 is a schematic representation of the steps, some of which are optional, comprehended by the invention disclosed, for recovery of silica, lignin, hemicellulose, cellulose derived sugars and heat energy from siliceous plant matter.

While the present invention will be described with reference to preferred embodiments, it will be understood by those who are skilled in the art that various changes may be made and equivalents may be substituted for elements thereof without departing from the scope of the invention. In addition, many modifications may be made to adapt a particular situation or material to the teachings of the invention without departing from the essential scope thereof. It is therefore intended that the present invention not be limited to the particular embodiments disclosed as the best mode contemplated for carrying out this invention, but that the invention will include all embodiments and legal equivalents thereof which are within the scope of the appended claims.

The work product of the invention is siliceous plant matter. While rice hulls, stalks and leaves are preferred because of their high content of amorphous silica, other siliceous plant matter, including bamboo, elephant grass and/or diatomaceous algae may be processed by the invention herein disclosed.

FIG. 1 is a schematic representation of the various steps, some of which are optional, which the invention comprehends for processing of siliceous plant matter; to produce silica, lignin, hemicellulose, cellulose derived sugars and heat energy; without reliance on external sources of energy, without carbonizing the atmosphere, without use of harsh, polluting chemicals and with decreased nitrous oxide and sulphur emissions.

Illustrated as Step 1 in FIG. 1, the first preferred step of the invention will be to clean the siliceous plant matter to remove foreign matter such as rocks, clumps of dirt, sand and other extraneous matter. In the case of rice hulls, this is preferably done by screening and washing. Because water is relatively inexpensive, washing will preferably be done with water. The water may contain a surfactant to aid in removal of extraneous matter. Depending on the nature of the siliceous matter and resources available at particular locations, other means for cleaning siliceous plant matter will be known to persons skilled in the art.

As is illustrated by Step 2 of FIG. 2, the second step of the preferred embodiment of the invention is to divide the siliceous plant matter into small particles by means which does not substantially contaminate the plant matter. Smaller particles are more readily wetted, soaked, penetrated by chemical bearing liquids and thermally pyrolyzed in later steps of the invention. Persons skilled in the art will recognize various means, including pulverizing, crushing, shredding, milling and the like, for dividing siliceous plant matter without introduction of contaminants.

Shown as Step 3 in FIG. 1 the third step of the preferred embodiment of the invention is to steep the plant matter in water which is preferable at an elevated temperature over an effective length of time. While no express claim can be made as to exact manner in which the beneficial effects of steeping the siliceous plant matter in water take place, the following effects are believed to thereby result: wetting and expanding the structure of the siliceous plant matter (thereby making it more penetrable by water borne chemical treatments to follow); removing water soluble inorganic compounds (preventing them from fluxing the silica during pyrolysis and constituting contaminants of the end product, silica, resulting from pyrolysis); and suspending or dissolving certain organic compounds such as lignin, hemicellulose and cellulose derived sugars from the siliceous plant matter, into water suspension or solution (which makes the siliceous structure of the plant matter more penetrable to chemical baths to follow), produces steep water from which useful organic substances, such as lignin, hemicellulose and cellulose derived sugars may be separated; and, by removal of at some organic compounds prior to pyrolysis, fewer nitrous oxide and sulphur emissions result from pyrolysis). While no express claim is made in said regard, it is believed that amorphous silica existing in siliceous plant matter in a lattice-like or honeycomb-like structure, which is intimately penetrated by long chain organic substances, such as lignin and cellulose, and various inorganic substances (such as iron, potassium, calcium, sodium and other metallic gels, hydrates and the like). An object of the invention is to provide a method to remove non-siliceous organic and inorganic compounds from the siliceous plant matter by means with does not cause the amorphous silica of the plant matter to flux and thereby "close" (become of less porosity). In general, this is done by pre-pyrolysis chemical treatments of the siliceous plant matter, hereinafter more fully described, which: a) removes the inorganic compounds of the matter which convert into compounds (such as metal oxides) which cause amorphous silica of the matter to flux during low temperature thermal pyrolysis in the presence of oxygen, and b) reducing naturally occurring organic com pounds (which are not volatilized low temperature thermal pyrolysis in the presence of oxygen) of the matter into other organic com pounds (which are volatilized, chiefly as carbon dioxide, by low temperature pyrolysis in the presence of oxygen). Step 3, described above is primarily directed to preparing the siliceous plant matter so as to facilitate these chemical treatments. Whatever the precise manner in which steeping the siliceous plant matter in water does so, it is observed that steeping the siliceous plant matter for approximately 1 or more hours at a temperature near the boiling point of water accelerates and improves the results of the subsequent chemical treatments.

A by-product of this step is the creation of a steep-water which contains useful organic compounds such as lignin and hemicellulose; which may be recovered (illustrated as Step 10 of FIG. 1) from the steep-water by filtration, centrifuging and/or other means know to persons skilled in the art. In addition removal of lignin and hemicellulose and water-soluble organic compounds before thermal pyrolysis, results in decreased nitrogen oxide and sulphur emissions during pyrolysis.

Steps 4 and 5 (illustrated in FIG. 1) of the preferred embodiment of the invention are to soak the remaining solids in an aqueous solution which solubilizes metallic compounds and other such inorganic impurities (Step 4) and/or soak said material an aqueous solution which contains an oxidizing solute. Each of these two steps of the invention may be combined with Step 3 of the invention (described above), with each other or (although not preferred) performed in reverse order. Namely, for instance, the water of Step 3 of the invention may contain, by way of example only, a solute of citric acid, which citric acid solubilizes metallic compounds (as specified by Step 4) by chelation, thereby simultaneously accomplishes the step of "steeping the siliceous plant matter" (Step 3) and "solubilizes metal compounds of the siliceous plant matter" (Step 3) of the invention. By way of further example an oxidizing solute (such as by way of example, peracetic acid) might be added as a solute (thereby satisfying Step 5 of the invention), thereby Step 3, 4 and 5 of the invention simultaneously accomplished by steeping the siliceous plant matter in water containing citric acid (a solubilizing agent) and peracetic acid (an oxidizing agent).

Despite the fact Steps 4 and 5 of the invention might be combined, and either or both of those steps combined with Step 3 of the invention, it should be understood that Steps 4 and 5 of the invention have different purposes, and accomplish different results. By understanding the purposes and results of each of these steps it will become apparent to persons skilled in the art that modification of each of these step might be done to selectively produce different end products, and end products of different qualities.

In the first instance it is noted that if Steps 3 and 4 of the invention are accomplished simultaneously, sequentially but without removal of the steep water, then the acid of Step 4 at appropriate temperature will hydrolyze the hemicellulose of the steep water into cellulose derived sugars, as is illustrated by Step 11 of FIG. 1.

It is also noted that Step 4, namely solubilizing metallic compounds of the siliceous plant matter by aqueous solution (which solution dissolves the solubilized compounds) has other functions. Namely removal of metallic compounds prior to pyrolysis of the siliceous plant matter increases the porosity of amorphous silica resulting from pyrolysis, allows pyrolysis to be conducted at a higher temperature (without fluxing of the amorphous silica) and results in a more pure amorphous silica (having less inorganic impurities).

While no express claim is made as to the exact manner in which solubilizing metallic compounds of the siliceous plant matter prior to pyrolysis thereof results in amorphous silica which has a higher porosity (higher surface area per unit weight) than amorphous silica produced without said step, it is believed that siliceous plant matter contains may metallic compounds, such as gels and hydrates, which on pyrolysis are converted to metallic oxides, and said oxides act as fluxing agents which cause structure of the amorphous silica of the plant matter (which in natural state is quite porous, commonly exceeding several hundred square meter per gram) to flux at fairly low temperatures (below 800° C.), become at least partially "closed", thereby less porous. By removing at least some of these metallic compounds (solubilizing them in aqueous solution which then dissolves them) this fluxing is believed to be avoided or reduced at particular temperatures and/or delayed to a higher temperature (which higher temperature increases the efficiency of recovering heat energy resulting from pyrolysis). In addition thereto, metallic compounds will generally be considered to be an undesirable impurity of the amorphous silica resulting from pyrolysis, their removal desired, and Step 4 provides a means to do so before pyrolysis (resulting in a more pure amorphous from pyrolysis).

For instance, by way of example only, amorphous silica resulting from pyrolysis of rice hills has been noted to increase from about 20 to 40 square meters/grams to as much as 300 to 400 square meters/grams when treated according to Step 4 of the invention prior to pyrolysis. In some cases, it may not matter if the amorphous silica resulting from pyrolysis is of low porosity. If so, this step of the invention might be eliminated or mitigated by use of a weaker solution, or at a lower temperature or over a shorter period of time.

In the preferred embodiment of the invention, citric acid is the preferred solubilizing solute of Step 4 of the invention. However, other water-soluble chelating agents, including ethylenediamine, ethylenediaminetetracetic acid ("EDTA") and dimercaprol, as well as other water-soluble chelating agents known to those skilled in the art, may be used. Alternatively, mineral and/or organic acids which do not dissolve silica may be used in lieu of or in addition to chelating agents. Care should be taken to select organic or mineral acids that do not in themselves constitute an undesirable contaminate the final silica product or change the silica surface chemistry thereof.

The exact concentration of solute to be used cannot be specified for various siliceous plant matter, as the amount of inorganic compounds contained in various siliceous plant matter varies according to plant species, soil and other growing conditions but will generally be one half to one mole of chelating agent (some chelating agents capture more than a mole for mole ratio of impurities) for each mole of inorganic compound to be removed from the siliceous plant matter before pyrolysis thereof. For highest chemical purity and porosity of the resulting amorphous silica, at least one mole or more of solute, in the case of citric acid, would be used for every mole of inorganic oxide present in the siliceous plant matter. If less chemical purity and porosity are desired or permissible, a less concentrated solution would be used, used over a shorter period of time or used at a lower temperature.

Two other beneficial effects are noted to result from removal of inorganic compounds as aforesaid. Namely, thermal pyrolysis may be conducted at a higher temperature (which is typically more efficient for recovery of heat energy) without fluxing of the amorphous silica, and the resulting end product (amorphous silica) contains less impurities to be dealt with by post-pyrolysis treatments.

Step 5, as illustrated on FIG. 1, of the invention will not be discussed. Step 5 of the invention is directed to reducing organic compounds of the siliceous matter which are not readily volatilized by pyrolysis in the presence of oxygen at fairly low temperatures (500° C. to 900° C.) to compounds which are readily volatilized (mostly as carbon dioxide) by pyrolysis in the presence of oxygen at such temperatures. To this end Step 5 involves soaking the siliceous plant matter in an aqueous solution containing a oxidizing solute prior to pyrolysis. While no express claim is made in the manner in which soaking the siliceous plant matter in an aqueous solution containing an oxidizing solute prior to pyrolysis results in removal of organic compounds during pyrolysis, it is believed that the oxidant of the solution acts like "chemical scissors"

which "cut" longer chain hydrocarbon compounds of the plant matter into shorter chain hydrocarbon compounds which facilely volatilize, mainly as carbon dioxide, during pyrolysis of the plant matter in the presence of oxygen. While any effective oxidizer appears effective in reducing the long chain hydrocarbon compounds of the biogenic material into compounds which are more easily volatilized during thermal pyrolysis in the presence of oxygen, care should be employed in choosing a solute which is economical, relatively safe, easy to use and does not itself contribute undesirable chemical residue to the end product (amorphous silica) which remains following thermal pyrolysis. Accordingly, many chlorates, perchlorates, nitrates, permanganates and certain peroxide compounds (such as Fenton's reagent), while comprehended by the invention, are not preferred. Peracetic acid is a preferred oxidizing solute because the acetic acid thereof catalyzes the hydrogen peroxide and its residue is easily removed by rinsing. However, hydrogen peroxide is the most preferred oxidizer because after it is spent, water is its only remainder. If the peroxide is not completely spent in processing the hulls, as will typically be the case so as to ensure full reduction of the organic material of the plant matter, the remaining oxygen spontaneously evolves over a short period of time, which evolution may be accelerated by heating, mechanical agitation, electrolytic or various other known means.

The strength of the oxidizing solute, time and temperature of exposure of the siliceous plant matter to said solute may be varied according to the characteristics of the plant matter (such as plant species, how finely divided it may be, time and temperature of pre-soaking, etc.), as well as the desired characteristics of the end product. That is, the step of soaking the siliceous plant matter in an aqueous solution is related to the amount of carbon and carbon compounds which will remain in the amorphous silica following the step of thermally pyrolyzing the siliceous plant matter which later follows. Therefore, if a virtually carbon-free amorphous silica is desired as an end product, a stronger oxidizing solution would be used, used at an elevated temperature and/or used over a longer period of time to assure complete reduction of the hydrocarbon molecules of the siliceous plant matter prior to pyrolysis.

Whatever time, temperature and concentration of oxidizing solution may be necessary to accomplish sufficient reduction of the organic material of the siliceous matter in particular cases, that may be facilely determined by placing a small quantity of treated hulls onto a heated (approximately 600° C.) metal plate exposed to air. If the siliceous plant matter oxidizes within seconds to a fine, pure white ash of substantially carbon free silica, then complete reduction of the hydrocarbons has taken place. If any carbonaceous residue (which can be seen as black "specks" and/or which may be found by laboratory testing) is detected, then additional reduction is required (if substantially carbon free amorphous silica is the desired end product). On the other hand, if some carbon residue in the amorphous silica is desired or acceptable, then a weaker oxidizing solution would be used at a lower temperature and/or over a shorter period of time. In fact, if it is not necessary to remove carbon at all from the end product (amorphous silica), the step of soaking the siliceous matter in an aqueous solution containing an oxidizing solute may be eliminated.

As is illustrated as Step 6 of FIG. 1, at the conclusion of soaking the siliceous plant matter as described above it is preferable to rinse the treated matter with water in order to remove inorganic compounds remaining on the matter or in the steep water which wets the matter. If very high purity silica is desired as an end product, it may be preferable, depending on the water quality available at particular locations, to flush said plant matter with water than has been filtered, de-ionized or even distilled. Following flushing of the plant matter it is preferably dried (as is illustrated by Step 7 of FIG. 1) prior to thermal pyrolysis thereof.

It can now be seen by varying Steps 4 and 5 of the invention, practitioner thereof may selectively control the quality of the amorphous silica produced according to the invention. That is, in general, if incomplete carbon removal from the end product is acceptable, then the step of soaking the siliceous plant matter in a solution containing an oxidizing solute may be eliminated or mitigated by less treatment in said regard (a weaker solution, at a lower temperature, or over a shorter period of time). On the other hand, if amorphous silica of relatively low porosity is an acceptable end product, then the step of soaking the siliceous plant matter in an aqueous solution which solubilizes inorganic compounds may be eliminated or mitigated by less treatment in that regards (using a weaker solution, at a lower temperature or over a shorter period of time). While in most cases amorphous silica which is substantially free of carbon, of high porosity and low in organic and inorganic residue will be desired, when this is not desirable or necessary the process may be varied to produce the particular quality of amorphous silica desired or necessary.

Following treatment as above, the treated siliceous plant matter is thermally pyrolyzed in the presence of oxygen (illustrated as Step 8 of FIG. 1) at a controlled temperature (preferably in the 500° C.-900° C. range, but less than 1,600° C.). Pyrolysis of siliceous plant matter at temperatures less than 900° C. will result in a silica which is amorphous in form. At temperatures in excess of 1000° C., formation of some crystalline silica may be expected. In excess of 1,600° C., substantially all the silica is likely to be crystalized. Silica produced by thermal pyrolysis at any of the above temperatures has no detectable water content.

Heat released (in the form of hot gases) during pyrolysis may be recovered by several means well known to persons skilled in the art. A non-obvious advantage of removing the inorganic compounds from the siliceous plant matter prior to pyrolysis is reducing the tendency of these not gases to coat heat exchanger surfaces that they impinge on with silica, decreasing the efficiency of these surfaces to exchange heat (which "glassification" is observed in combusting non-treated siliceous plant matter in water-tube heat exchangers).

Following pyrolysis the resulting amorphous silica may be subjected to a variety of baths and/or rinses (illustrated by Step 9 of FIG. 1) which may contain may contain chelating agents, ammonia, mineral and organic acids or base solutes to enhance removal of any residue which may remain therein.

Several things about the invention are hereinafter set forth that may not otherwise be obvious. Pyrolysis of the siliceous plant matter in the presence of oxygen is an exothermic process which yields usable heat energy which is in excess of that consumed by the process (such as heating soaking solutions), and thus constitutes a source of renewable energy independent of fossil fuels or external energy sources. In addition thereto, this excess energy is available without net carbonization of the atmosphere (carbon released into the atmosphere during pyrolysis is withdrawn from the atmosphere when the siliceous plant matter is re-grown). Therefore, crops such as rice become not only a food source, but also a source of renewable energy which produces no net carbonization of the atmosphere. In addition thereto, removal of lignin and hemicellulose before pyrolysis, in combination with pyrolysis at a fairly low temperature (typically in the range of 500° C.-900° C., but less than 1,600° C.), results in lower nitrogen oxide emissions in combusting untreated rice hills in currently used steam generating facilities. Not only that, but the lignin and hemicellulose recovered from steep water are in and of themselves useful products of independent value. Thus, from the process herein disclosed and claimed, siliceous plant matter can be employed to generate a variety of highly useful products, including amorphous silica (of selectively controllable qualities), lignin, hemicellulose, cellulose derived sugars and heat energy without carbonization of the atmosphere and with lower nitrogen oxide emissions than those that result from burning siliceous plant matter not treated as herein described.

While the above description contains certain specifics, these should not be construed as limitations on the scope of the invention, but rather as an exemplification of one preferred embodiment thereof. Accordingly, the scope of the present invention should be determined not by the embodiment(s) illustrated, but by the appended claims and their legal equivalents.

What is claimed is:

1. A process for production of amorphous silica from unburned rice hulls containing water insoluble metallic compounds comprising the steps of:
   soaking said unburned rice hulls in an aqueous based solution comprising a solute comprised of a chelating agent, wherein said chelating agent is present in an amount which solublizes at least some of said water insoluble metallic compounds;
   after said step of soaking said unburned rice hulls, separating the aqueous solution from the unburned rice hulls; and,
   after said step of separating the aqueous solution from the unburned rice hulls, thermally pyrolyzing said unburned rice hulls in the presence of oxygen at a temperature wherein the resulting silica is comprised of amorphous silica having a reduced content of water insoluable metallic compounds.

2. The process of claim 1 wherein the chelating agent is selected from the group consisting of citric acid, ethylenediamine, ethylenediaminetetracetic acid ("EDTA") and dimercaprol.

3. The process of claim 2 further comprising the step of soaking the unburned rice hulls in an aqueous solution containing an oxidizing solute prior to the step of thermally pyrolyzing the unburned rice hulls in the presence of oxygen.

4. The process of claim 3 wherein the oxidizing solute is comprised of peracetic acid.

5. The process of claim 1 further comprising the step of soaking the unburned rice hulls in an aqueous solution containing an oxidizing solute prior to the step of thermally pyrolyzing the unburned rice hulls in the presence of oxygen.

6. The process of claim 5 wherein the oxidizing solute is comprised of peracetic acid.

7. The process of claim 1 wherein the amount of chelating agent comprising the solute of the aqueous based solution and the temperature at which the step of thermally pyrolyzing the unburned rice hulls in the presence of oxygen is conducted are selected so as to result in amorphous silica of a selected surface area up to 400 square meters per gram at the end of the step of thermally pyrolyzing the unburned rice hulls in the presence of oxygen.

8. The process of claim 7 further comprising the step of soaking the unburned rice hulls in an aqueous solution containing an oxidizing solute prior to the step of thermally pyrolyzing the unburned rice hulls in the presence of oxygen.

9. The process of claim 8 wherein the oxidizing solute is comprised of peracetic acid.

* * * * *